Dec. 21, 1943.  O. KOHLER  2,337,052
APPARATUS FOR ORNAMENTING CHRISTMAS TREE BALLS
Filed July 5, 1940  2 Sheets-Sheet 1
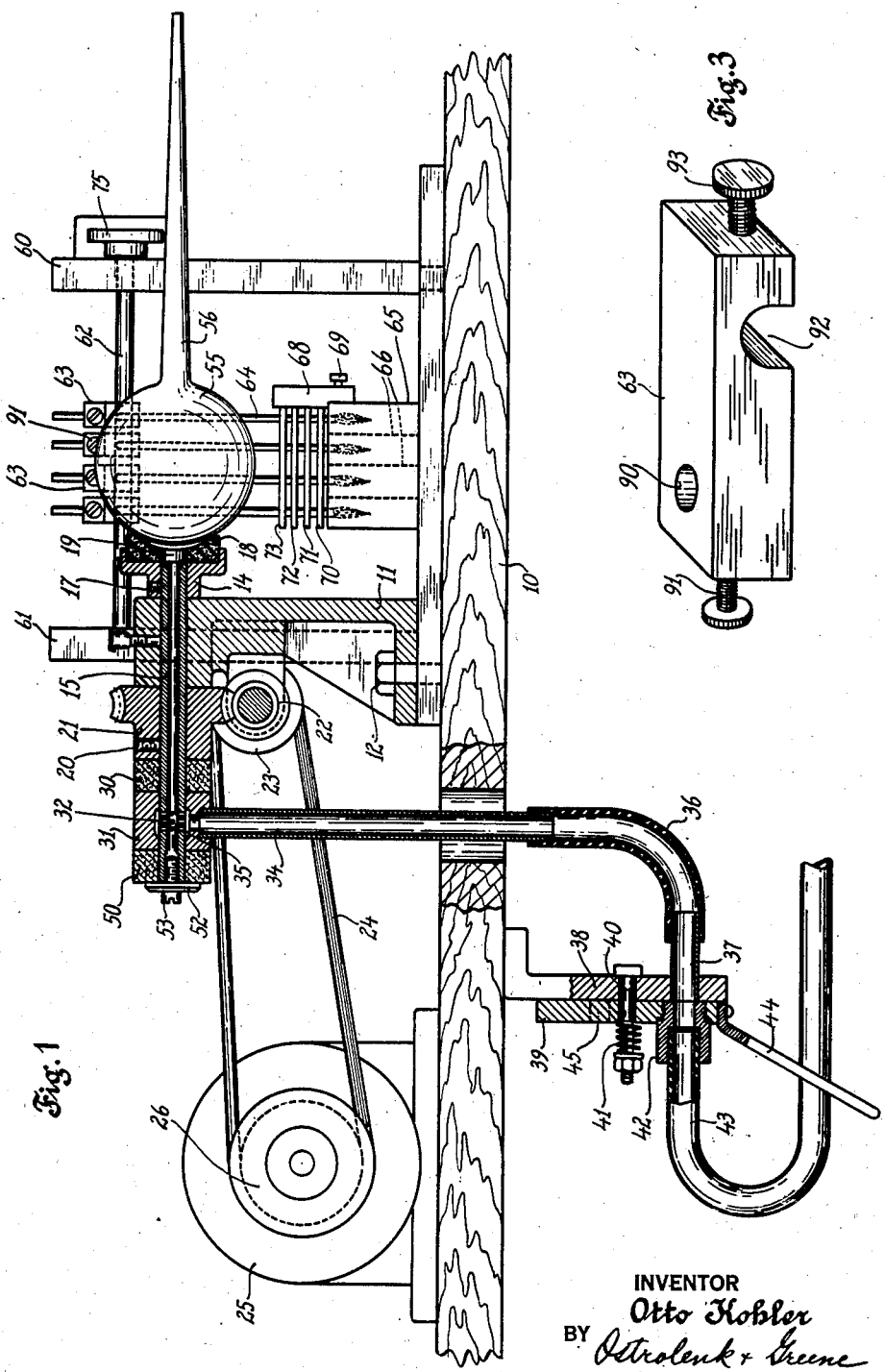
INVENTOR
Otto Kohler
BY Ostrolenk + Greene
ATTORNEYS

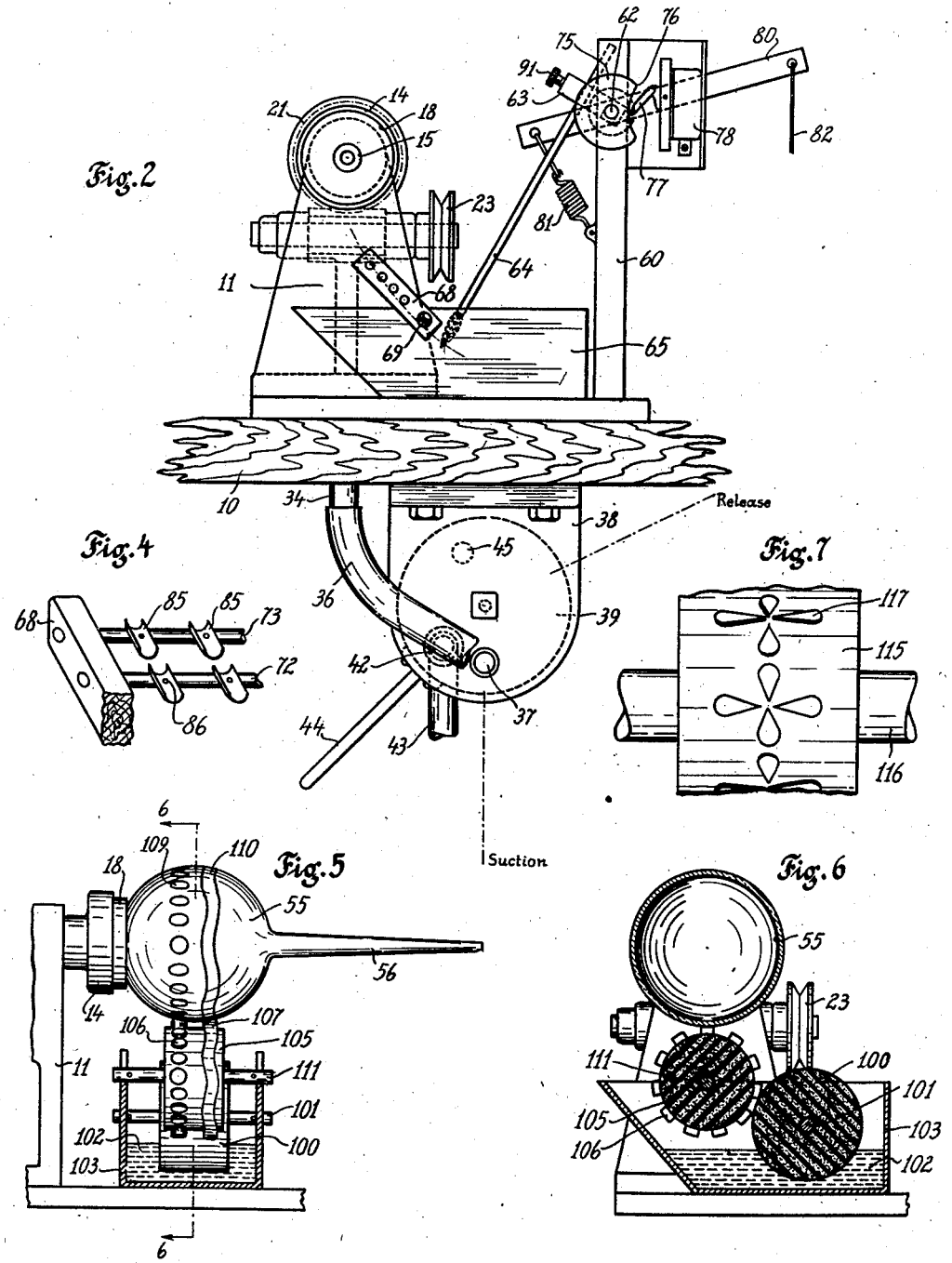

Patented Dec. 21, 1943

2,337,052

UNITED STATES PATENT OFFICE 2,337,052

APPARATUS FOR ORNAMENTING CHRISTMAS TREE BALLS

Otto Kohler, Cliffside Park, N. J.

Application July 5, 1940, Serial No. 343,936

7 Claims. (Cl. 91—12)

My invention relates to a novel apparatus for decorating ornamental objects and more particularly my invention relates to a machine for applying decorative matter to non-uniform spherical objects such as Christmas tree ornaments.

The Christmas tree ornaments which my machine decorates are in the form of generally spherical objects with stems. These objects are formed by heating a glass tube and blowing the heated glass tube to the desired spherical shape. This blowing is generally conducted by skilled glass blowers and since no mold is employed, the resultant ornament is usually slightly irregular or non-uniform in size and shape. The blown glass object is also rather fragile since the glass is blown to a substantial volume whereupon the blown glass walls become extremely thin and hence susceptible to fracture upon shock.

Hitherto, such irregular, fragile, non-uniform spherical objects have been decorated with paint, lacquer, or the like by hand application of the decorative material thereto. As is obvious hand decoration is slow and relatively expensive, but because of the irregular and fragile nature of the object to be decorated, such hand work was necessary.

It is the object of my invention to provide a novel apparatus for the decoration of generally spherical objects.

It is another object of my invention to provide a novel machine for the application of decorative material, such as paint to fragile irregular ornaments, such as blown glass Christmas tree ornaments.

It is a further object of my invention to provide a machine adapted to safely handle and position for ornamentation an irregular fragile article.

It is a further object of my invention to provide a novel machine having a soft and resilient holding chuck adapted to uniformly rotate irregular, generally spherical objects.

It is a further object of my invention to provide a machine adapted to ornament by a battery of simultaneously manoeuvred brushes, an irregular and fragile spherical object.

It is a further object of my invention to provide a novel machine adapted to engage a fragile and irregular spherical object positioned in a rubber chuck by suction and to rotate such object for ornamentation.

It is a further object of my invention to provide a novel apparatus in which operation of the ornamenting means causes simultaneous actuation of a rotating means adapted to rotate a firmly gripped irregular ornament.

It is a further object of my invention to provide a novel means for preparing a brush dipped in paint so that the brush applies a uniform non-spreading ornamental line of paint.

It is a further object of my invention to provide a novel machine comprising means for gently holding and uniformly rotating a spherical object in combination with a means for continuously applying ornamentation thereto.

Further objects of my invention will be apparent from a consideration of the drawings and the specific description which here follows.

Figure 1 is a side elevation, perspective and partial cross section of the apparatus of my invention with the irregular and fragile glass ornament in its proper position.

Figure 2 is an end elevational view of the apparatus of my invention.

Figure 3 is a perspective of the brush holding means of my apparatus.

Figure 4 is a detailed perspective showing the means for preparing the dipped paint brushes for application of the proper paint line to the spherical object.

Figure 5 is a front view of a modified form of my invention in which a roll carrying raised members is positioned to continuously contact and apply decorative figures to the spherical ornament.

Figure 6 is a cross section taken along the line 6—6 of Figure 5.

Figure 7 shows a detail of another modified form of my invention comprising a roll adapted to contact an ornament to a spherical ornamental object.

Referring now specifically to Figure 1 I show an apparatus of my invention which comprises a base 10 on which is mounted a suitable bracket 11 secured on the base 10 by the bolt 12. In the bracket 11 is positioned a chuck 14 mounted on a hollow shaft 15. The chuck 14 is fixed to the hollow shaft 15 by the fixing member 17. Positioned in the chuck 14 is a soft and resilient seat member 18 which may be of rubber or expanded rubber such as closed cell rubber or sponge rubber. In the center of this seat member 18 is an opening 19. The hollow shaft 15 mounted in the bracket 11 is fixed to the worm gear 21 by means of the fixing member 20. The worm gear 21 engages the worm 22 which is rotated by the pulley 23 which in turn is engaged and rotated by a belt 24. The belt 24 is rotated by a source of power such as the motor 25 operating through the pulley 26. Adjacent the worm gear 21 is a fibre spacer 30 which spaces the rotating worm gear 21 and the stationary vacuum swivel 31. That portion of the hollow shaft 15 which rotates in this vacuum swivel 31 is perforated with perforations 32 so that a vacuum connection is afforded between the hollow shaft 15 and the tube 34 through the passage 35 provided in the member 31.

Tube 34 is joined by a flexible connection 36 to the tube 37. Tube 37 is mounted in a depending disc member 38. To provide a suitable control member for the suction, I attach to this depending disc member 38 a disc 39 by means of the bolt 40. A spring 41 resiliently maintains the disc 39 against the depending disc member 38.

As can be more clearly seen from a consideration of Figure 2, the disc member 39 has located therein a connecting member 42 which carries the flexible hose 43 which is connected to a suitable source of suction. Rotation of the disc 39 about the member 40 is effected by the lever 44. Opening 45 shown in dotted line is provided in the disc 39 to afford access to the air when it is desired to relieve the suction in the hollow shaft 15.

Returning to the mounting of the hollow shaft 15, it will be noted that a second fibre spacer 50 separates the suction swivel 31 from the retaining end member 52 which is maintained in position by the head screw 53. Removal of the head screw 53 provides access to the hollow shaft 15 for cleansing. Mounted in the resilient rubber seat 18 of chuck 14 is the blown glass object 55 having a stem 56. The blown glass object 55 is ordinarily manufactured by softening a glass tube in a flame and blowing the soft glass tube until the proper size and shape is obtained, whereupon the blown glass object is cooled to set it in the desired shape. Stem 56 forms a part of the ultimate ornamental object.

Turning now to the mechanism for applying the ornamental stripe to the spherical object 55, it will be noted that I provide a brush holding device comprising posts 60 and 61 in which is rotatably mounted the shaft 62. Fixed on the shaft 62 are brush holding devices 63 shown in detail in Figure 3. Mounted in these brush holding devices 63 are brushes 64 which in their lower position dip into the paint tank 65 which may be divided into a plurality of sections by means of the partition members 66 shown in dotted line. Suitably mounted at the proper angle is a brush preparing device 68 which is angularly adjustable through the screw member 69. The brush preparing device 68 comprises a plurality of rods 70, 71, 72 and 73 which are adapted to contact the brush to remove the excess paint therefrom and to prepare the brush for application to the spherical object 55, as will be more specifically described hereinafter. At the end of the shaft 62 is mounted a cam 75 which cam operates a switch, causing rotation of the hollow shaft 15 as will be more specifically described in connection with Figure 2.

Referring now to Figure 2 in which my apparatus is shown in end elevation, it will be noted that rotation of the shaft 62 causes the cam 75 to move in a clockwise direction with the portion 76 of the cam acting to press down the spring member 77 of the switch 78. The switch member 78 actuates the motor 25 causing rotation of the hollow shaft 15 through the pulley 23. Rotation of the shaft 62 is effected by the downward movement of the lever 80 which is effected by the connecting member 82 which is joined to a treadle device. The lever 80 acts against the spring member 81 so that the release of the treadle device causes the lever 80 to be returned to its original position, whereupon the cam 25 moves counterclockwise releasing the spring switch member 77. When the lever 80 is downwardly propelled, the shaft 62 rotates carrying with it the brushes 64 which are upwardly carried from the paint tank 65. The brush then consecutively contacts the brush preparing rods 70, 71, 72, and 73, which prepare the brush for application to the spherical object held in the chuck by removing undesired excess paint and by acting to point the end of the brush.

Although plain rods may be employed for this brush preparing operation I may employ channel members 85 (see Figure 4) mounted on the rods 70, 71, 72 and 73 by suitable fastening means such as rivets 86. These channel members remove the excess paint and tip the brush.

In its path in contact with these brush preparing rods 70, 71, 72 and 73, the brush travels in approximately the path shown by the dotted line of Figure 2. It will be noted that the brush contacts the first rod 70 at a point well within the tip of the brush and that the contact is progressively lighter, the last rod 73 touching merely the tip of the brush.

With regard to the suction apparatus, it will be noted that when the hose 43 mounted in the disc 39 is positioned in contact with the hose member 37 by means of the lever 44, the suction connection is afforded and suction is imparted to the chuck through the hollow shaft 15. When the lever is rotated to the dotted line position marked "release" then the opening 45 in the disc 39 releases the suction since normal air pressure then penetrates in to the hollow shaft 15.

In Figure 3 I show the enlargement of the brush holding device 63. This brush holding device is characterized by an opening 90 into which the handle of the brush 64 is inserted, the brush handle being fixed in place by rotation of the screw 91 which engages the brush handle. The brush holding device 63 is adapted to be engaged with the shaft 62 by means of the opening 92 and the facing screw 93. The opening 92 affords a simple and effective way of fixedly securing and removing the brush holding device 63 to the shaft 62.

The operation of my apparatus is as follows:

The operator moves the lever 44 of the suction control device so that the tube 43 is in direct connection with the tube 37 whereupon suction from a suitable suction device reduces the pressure in the hollow shaft 15. The operator then places the generally spherical object 55 against the rubber seat 18 of the chuck 14. The reduced pressure or suction firmly holds the spherical object in position. Even though the spherical object 55 be slightly irregular in size or shape effective gripping of the object by the rubber seat 18 is assured. Further, although the object 55 is fragile in nature it is not subjected to any rigid gripping strains.

The operator then pulls down the lever 80 by stepping on a suitable treadle, whereupon the lever 80 acts against the spring 81 and simultaneously rotates the shaft 62 and the cam 75. Rotation of the cam 75 closes snap switch 77 which actuates the motor 25 causing rotation of the pulley 26 connecting belt 24 and pulley 23. Rotation of the pulley 23 rotates the worm 22 which in turn actuates worm gear 21. Worm gear 21 being fixedly attached to the hollow shaft 15 by the member 20 causes rotation of the chuck 14 fixedly mounted on the shaft 15 by the fixing member 17.

Rotation of the chuck causes rotation of the spherical object 55 held in the resilient seat 18 of the chuck. Simultaneously with this rotating movement, rotation of the shaft 62 brings the brush 64 out of the tank 65, which may be a single tank or a multiplicity of individual tanks having different colors of paint. The paint brush 65 is moved up in contact with the brush preparing rods 70, 71, 72 and 73 which act to remove excess paint and to point and prepare the brush for contact with the spherical object 55. The last rod 73 barely tips the end of the brush. Shaft 62 still in its path of rotation carries the brush 64 up into contact with the rotating spherical object 55. When the complete rotation of the spherical object 55 has been effected and the desired ornamental line or lines circumscribed about the spherical object 55, the operator releases the treadle, whereupon the spring 81 returns the lever 80 to its original position. As the lever 80 returns to its original position, it rotates the fixedly mounted shaft 62 causing release of the snap switch 77, which stops the motor 25 and hence rotation of the spherical object 55 and at the same time returns the brush 64 to its original position in the tank of paint 65. The operator then removes the spherical object 55 by so rotating the lever 44 until suction is released and normal air pressure prevails in the hollow shaft 15. The operation here described is rapid, efficient and economical and calls for a minimum of movement on the part of the operator.

In lieu of employing a brush for application of the ornamental material to the spherical objects 55, I may employ a device as shown in Figures 5, 6 and 7. As shown in Figure 5, the decorating device comprises a dipping roller 100 mounted on a shaft 101. The dipping roller 100 dips in the paint or lacquer 102 held in the tank 103. A rotating roll 105 which may be of rubber or the like carries raised painting members 106 and 107 which contact the dipping roll 100 and pick paint from the surface thereof. The raised members 106 and 107 continuously apply the paint to the surface of the spherical object 55 in the form of ornamentations 109 and 110. As described above, the spherical object 55 is held in the resilient seat 18 of the chuck 14. An examination of the cross sectional view shown in Figure 6, taken along the line 6—6 of Figure 5, it is believed, will clearly illustrate this apparatus feature.

If the resilient nature of the raised printing members 106 and 107 is not sufficient to compensate for the irregularity of the rotating spherical object 55, I may provide that the shaft 111 of the roll 105 be upwardly impelled by spring action so that it will follow the irregularity of the surface in the rotation of the spherical object 55. The spring action is such that the roll is moved upwardly but still in contact with the dipping roll 100. The path of movement of the roll 105 is thus in this modified form such that the roll 105 is yieldably impelled between the spherical object 55 and the dipping roll 100.

In Figure 7 I show a modified form of my printing roll 105 in which I employ a roll 115 mounted on a shaft 116, the roll 115 carrying raised printing members 117.

By means of a device such as is shown in Figures 5, 6 and 7 a multiplicity of different types of ornamentation may be continuously applied to fragile and slightly irregular rotating objects.

I have specifically set forth a detailed description of one form of my invention. Certain modifications can be effected in this apparatus to secure the results set forth and it is understood that I intend to be limited not by the specific description here set forth, but only by the appended claims.

I claim:

1. A machine for ornamenting a fragile and irregular object which comprises means for holding said object, means for rotating said object, means for continuously applying ornamentation to said object, said means comprising a brush mounted on a shaft and means for holding a liquid ornamenting material, means comprising wiping elements for preparing the brush for application of the liquid ornamenting material to the object, and means for swinging said brush into contact with said wiping elements.

2. A machine for ornamenting a fragile and irregular object which comprises means for holding and rotating said object comprising a soft and resilient seat positioned in a chuck, means for holding said object in said soft and resilient seat comprising a reduced air pressure line opening into said soft and resilient seat, means for continuously applying ornamentation to said object, said means comprising a brush mounted on a shaft, means for holding a liquid ornamenting material, said brush being positioned on said shaft so as to normally dip into said liquid ornamenting material, means for rotating said shaft to bring said brush out of said material and into contact with said object.

3. A machine for ornamenting a fragile and irregular object which comprises means for holding and rotating said object comprising a soft and resilient seat positioned in a chuck, means for holding said object in said soft and resilient seat comprising a reduced air pressure line opening into said soft and resilient seat, means for continuously applying ornamentation to said object, said means comprising a brush mounted on a shaft, means for holding a liquid ornamenting material, said brush being positioned on said shaft so as to normally dip into said liquid ornamenting material, means for rotating said shaft to bring said brush out of said material and into contact with said object and means comprising wiping elements for preparing the brush for application of the liquid ornamenting material to the object.

4. A machine for ornamenting a fragile and irregular object which comprises means for holding and rotating said object comprising a soft and resilient seat positioned in a chuck, means for holding said object in said soft and resilient seat comprising a reduced air pressure line opening into said soft and resilient seat, means for continuously applying ornamentation to said object, said means comprising a brush mounted on a shaft, means for holding a liquid ornamenting material, said brush being positioned on said shaft so as to normally dip into said liquid ornamenting material, means for rotating said shaft to bring said brush out of said material and into contact with said object and means for preparing the brush for application of the liquid ornamenting material to the object, said means comprising wiping elements for said brush, a cam mounted on said shaft, said cam upon rotation being adapted to actuate a switch, said switch actuating a motor, said motor being connected to rotate said chuck.

5. A machine for ornamenting a fragile and irregular object which comprises means for holding and rotating said object comprising a soft and resilient seat positioned in a chuck, means for holding said object in said soft and resilient seat comprising a reduced air pressure line opening into said soft and resilient seat, means for continuously applying ornamentation to said object, said means comprising a brush mounted on a shaft, means for holding a liquid ornamenting material, said brush being positioned on said shaft so as to normally dip into said liquid ornamenting material, means for rotating said shaft to bring said brush out of said material and into contact with said object and means for preparing the brush for application of the liquid ornamenting material to the object, said means for preparing said brush comprising a plurality of rods, and brush tipping channel members positioned to contact said brush mounted on said rods.

6. A machine for ornamenting a fragile and irregular object which comprises means for holding and rotating said object comprising a soft and resilient seat positioned in a chuck, means for holding said object in said soft and resilient seat comprising a reduced air pressure line opening into said soft and resilient seat, means for continuously applying ornamentation to said object, said means comprising a brush mounted on a shaft, means for holding a liquid ornamenting material, said brush being positioned on said shaft so as to normally dip into said liquid ornamenting material, means for rotating said shaft to bring said brush out of said material and into contact with said object and wiping means for preparing the brush for application of the liquid ornamenting material to the object, said wiping means being positioned to remove excess ornamenting material from said brush and to point the end of said brush, a cam mounted on said shaft, said cam upon rotation being adapted to actuate a switch, said switch actuating a motor, said motor being connected to rotate said chuck, and means for causing rotation of said shaft to bring said brush into contact with said object and to actuate said motor.

7. A machine for ornamenting a fragile and irregular object which comprises means for holding and rotating said object comprising a soft and resilient seat positioned in a chuck, means for holding said object in said soft and resilient seat comprising a reduced air pressure line opening into said soft and resilient seat, means for continuously applying ornamentation to said object, said means comprising a brush mounted on a shaft, means for holding a liquid ornamenting material, said brush being positioned on said shaft so as to normally dip into said liquid ornamenting material, means for rotating said shaft to bring said brush out of said material and into contact with said object and wiping means for preparing the brush for application of the liquid ornamenting material to the object, said means for preparing said brush comprising a plurality of rods positioned to remove excess ornamenting material from said brush and to point the end of said brush.

OTTO KOHLER.